(12) United States Patent
Ikawa et al.

(10) Patent No.: US 9,672,027 B2
(45) Date of Patent: Jun. 6, 2017

(54) INFORMATION PROCESSING APPARATUS AND INFORMATION PROCESSING SYSTEM

(71) Applicants: Taku Ikawa, Kanagawa (JP); Yuuko Sugiura, Tokyo (JP); Tomoya Hirokawa, Kanagawa (JP); Xiaofeng Han, Kanagawa (JP)

(72) Inventors: Taku Ikawa, Kanagawa (JP); Yuuko Sugiura, Tokyo (JP); Tomoya Hirokawa, Kanagawa (JP); Xiaofeng Han, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/686,921

(22) Filed: Apr. 15, 2015

(65) Prior Publication Data
US 2015/0220323 A1 Aug. 6, 2015

Related U.S. Application Data

(63) Continuation of application No. 13/816,758, filed as application No. PCT/JP2011/068491 on Aug. 8, 2011, now Pat. No. 9,063,810.

(30) Foreign Application Priority Data

Aug. 19, 2010 (JP) .................................. 2010-183671

(51) Int. Cl.
*G06F 9/44* (2006.01)
*G06F 9/445* (2006.01)
*G06F 3/12* (2006.01)

(52) U.S. Cl.
CPC .................. *G06F 8/65* (2013.01); *G06F 3/12* (2013.01); *G06F 8/60* (2013.01); *G06F 8/61* (2013.01); *G06F 8/67* (2013.01); *G06F 8/71* (2013.01)

(58) Field of Classification Search
CPC ................................................ G06F 8/60–8/78
See application file for complete search history.

(56) References Cited

U.S. PATENT DOCUMENTS 6,101,505 A 8/2000 Sun
6,643,506 B1 11/2003 Criss et al.
(Continued)

FOREIGN PATENT DOCUMENTS

GB 2325766 12/1998
JP H09-114649 5/1997
(Continued)

OTHER PUBLICATIONS

Dolstra, Eelco et al., "Imposing a Memory Management Discipline on Software Deployment", 2004, pp. 1-10.*
(Continued)

*Primary Examiner* — Thuy Dao
*Assistant Examiner* — Christopher Franco
(74) *Attorney, Agent, or Firm* — IPUSA, PLLC (57) ABSTRACT

An information processing apparatus includes a storage unit that stores combination information relevant to combinations of different types of first programs that can be installed in a device, the combination information including memory consumption amounts of the combinations; a receiving unit that receives an install target first program and device information relevant to the device; and a determining unit that determines validity of installing the install target first program in the device by determining, by referring to the combination information, a predicted memory consumption amount corresponding to a first combination including the install target first program and an existing first program that is installed in the device and indicated in the device information, and by comparing the predicted memory consump-
(Continued)

tion amount with a device memory consumption amount of the device indicated in the device information.

9 Claims, 10 Drawing Sheets (56) References Cited

U.S. PATENT DOCUMENTS

| | | | |
|---|---|---|---|
| 7,151,921 B2 | 12/2006 | Otsuka | |
| 7,823,145 B1 | 10/2010 | Le et al. | |
| 8,191,061 B2 | 5/2012 | Jun et al. | |
| 8,237,941 B2 | 8/2012 | Naitoh | |
| 8,305,591 B2 | 11/2012 | Akiyoshi et al. | |
| 8,522,228 B1 | 8/2013 | Le et al. | |
| 9,092,286 B2* | 7/2015 | Sprigg | G06F 8/60 |
| 2001/0044857 A1* | 11/2001 | Pham | G06F 8/61 |
| | | | 719/327 |
| 2003/0023963 A1 | 1/2003 | Birkholz et al. | |
| 2004/0068634 A1 | 4/2004 | Otsuka | |
| 2004/0109188 A1 | 6/2004 | Akiyoshi et al. | |
| 2006/0061789 A1* | 3/2006 | Yamaoka | G06F 8/65 |
| | | | 358/1.13 |
| 2007/0074201 A1* | 3/2007 | Lee | G06F 8/65 |
| | | | 717/173 |
| 2007/0192462 A1* | 8/2007 | Bae | H04L 12/2809 |
| | | | 709/223 |
| 2008/0046880 A1 | 2/2008 | Jun et al. | |
| 2008/0127169 A1* | 5/2008 | Malasky | G06F 8/61 |
| | | | 717/174 |
| 2008/0167025 A1* | 7/2008 | Williamson | H04W 4/02 |
| | | | 455/418 |
| 2008/0184218 A1 | 7/2008 | Largman et al. | |
| 2008/0196017 A1 | 8/2008 | Ritzau et al. | |
| 2008/0209569 A1 | 8/2008 | Araki | |
| 2009/0204957 A1 | 8/2009 | Nishibayashi et al. | |
| 2009/0260004 A1* | 10/2009 | Datta | G06F 8/65 |
| | | | 717/175 |
| 2009/0307682 A1* | 12/2009 | Gharabally | G06F 8/65 |
| | | | 717/172 |
| 2010/0058482 A1 | 3/2010 | Nagumo et al. | |
| 2010/0071069 A1 | 3/2010 | Sugiura et al. | |
| 2010/0199078 A1 | 8/2010 | Shih et al. | |
| 2011/0041125 A1 | 2/2011 | Sugiura | |
| 2011/0055825 A1 | 3/2011 | Ikawa et al. | |
| 2011/0066886 A1 | 3/2011 | Sugiura et al. | |
| 2011/0066960 A1* | 3/2011 | Suzuki | G06F 8/65 |
| | | | 715/764 |
| 2011/0066972 A1 | 3/2011 | Sugiura | |
| 2011/0067117 A1 | 3/2011 | Nagumo et al. | |
| 2011/0126192 A1 | 5/2011 | Frost et al. | |
| 2011/0265080 A1* | 10/2011 | Matthew | G06F 8/61 |
| | | | 717/176 |
| 2011/0276956 A1* | 11/2011 | Yuki | G06F 8/65 |
| | | | 717/170 |
| 2011/0289499 A1* | 11/2011 | Haubold | G06F 8/65 |
| | | | 717/173 |
| 2012/0069366 A1* | 3/2012 | Heffner | G06F 3/1204 |
| | | | 358/1.13 |
| 2012/0166516 A1* | 6/2012 | Simmons | H04L 67/1095 |
| | | | 709/202 |
| 2012/0167071 A1* | 6/2012 | Paek | G06F 8/65 |
| | | | 717/170 |
| 2015/0319218 A1* | 11/2015 | Sprigg | G06F 8/60 |
| | | | 717/171 |

FOREIGN PATENT DOCUMENTS

| | | |
|---|---|---|
| JP | H10-340187 | 12/1998 |
| JP | 2004-122773 | 4/2004 |
| JP | 2004-127281 | 4/2004 |
| JP | 2005-018683 | 1/2005 |
| JP | 2005-297237 | 10/2005 |
| JP | 2006-079534 | 3/2006 |
| JP | 2006-227871 | 8/2006 |
| JP | 2006-285871 | 10/2006 |
| JP | 2008-015794 | 1/2008 |
| JP | 2008-055849 | 3/2008 |
| JP | 2008-243179 | 10/2008 |
| JP | 4227342 | 2/2009 |
| JP | 2009-093228 | 4/2009 |
| JP | 2009-230398 | 10/2009 |
| JP | 2010-055279 | 3/2010 |

OTHER PUBLICATIONS

Whaley, R. Clint et al., "Automated empirical optimizations of software and the ATLAS project", 2001, pp. 3-35.*
Bouchenak, Sara et al., "Autonomic Management of Clustered Applications", 2006, pp. 1-11.*
Shereshevsky, Mark et al., "Software Aging and Multifractality of Memory Resources", 2003, pp. 1-10.*
Lewis, Jarrod A. et al., "Avoiding Initialization Misses to the Heap", 2002, pp. 183-194.*
Gehring, Jorn et al., "Robust Resource Management for Metacomputers", 2000, pp. 105-111.*
Japanese Office Action dated Apr. 14, 2015.
International Search Report Issued Sep. 6, 2011 in PCT/JP2011/068491 filed on Aug. 8, 2011.
Extended European search report dated May 9, 2014.
Japanese Office Action dated Sep. 24, 2014.
Bouchenak, Sara et al., Autonomic Management of Clustered Applications, 2006, pp. 1-11.
Dolstra, Eelco et al., Imposing a Memory Management Discipline on Software Deployment, 2004, pp. 583-592.
Albrecht, Jeannie et al., Remote Control_Distributed Application Configuration, Management, and Visualization with Plush, 2007, pp. 183-201.
Nod, Anil, Mobile and Embedded Databases, 2007, pp. 1175-1177.
Artho, Cyrille et al., Why Do Software Packages Conflict?, 2012, pp. 141-150.
Baek, Seungcheol, Size-Aware Cache Management for Compressed Cache Architectures, 2013, pp. 1-14.

* cited by examiner

DEVICE INFORMATION

| DEVICE ID | ... |
|---|---|

APPLICATION INFORMATION

| PRODUCT ID | VERSION |
|---|---|
| P0000001 | 2.01 |
| P0000002 | 13.00 |
| ⋮ | ⋮ |
| P0000010 | 4.20 |

PLATFORM INFORMATION

| MODULE ID | VERSION | |
|---|---|---|
| FW1SYS | 2.01 | |
| FW2SYS | 4.20 | |
| ⋮ | ⋮ | |
| FW5SYS | 1.20 | |

MEMORY INFORMATION

| STACK AREA SET VALUE | ... |
|---|---|
| STACK AREA UPPER LIMIT VALUE | ... |
| HEAP AREA SET VALUE | ... |
| HEAP AREA UPPER LIMIT VALUE | ... |

| PRODUCT ID | PRODUCT KEY |
|---|---|
| P0000001 | AAAAXXXX111 |
|  | BBBBYYYY222 |
|  | CCCCZZZZ333 |
| P0000002 | DDDDPPPP444 |
| : | : |
| P0000010 | ZZZZABCD111 |
|  | YYYYABCD123 |

FIG.8

| COMBINATION NUMBER | P0000001 | P0000002 | P0000003 | P0000004 | ... | P0000010 |
|---|---|---|---|---|---|---|
| COMBINATION 1 | ○ | ○ | | | | |
| COMBINATION 2 | ○ | | ○ | | | |
| COMBINATION 3 | ○ | ○ | ○ | | | |
| COMBINATION 4 | ○ | | | ○ | | |
| ... | | | | | | |

| COMBINATION 1 | | |
|---|---|---|
| STACK AREA MINIMUM VALUE | | 50~ |
| HEAP AREA MINIMUM VALUE | | 10~ |
| APPLICATION VERSION | P0000001 | 2.00~ |
| | P0000002 | 1.02~3.50, 5.00~ |
| PLATFORM VERSION | FW1SYS | 1.00~ |
| | FW2SYS | 1.04~ |
| | FW3SYS | 2.01~2.04, 3.00~ |
| | : | : |
| | FW5SYS | 1.00~ |

FIG.10

| APPLICATION VERSION | P0000001 | 2.00~ |
|---|---|---|
| | P0000002 | 1.02~3.50, 5.00~ |
| PLATFORM VERSION | FW2SYS | 1.04~ |
| | FW3SYS | 2.01~2.04, 3.00~ |
| STACK AREA SET VALUE | | – |
| HEAP AREA SET VALUE | | 10~ |

INFORMATION PROCESSING APPARATUS AND INFORMATION PROCESSING SYSTEM

CROSS-REFERENCE TO RELATED APPLICATIONS

The present application is a continuation application of U.S. patent application Ser. No. 13/816,758 filed on Feb. 13, 2013, which is based on PCT International Application No. PCT/JP2011/068491 filed on Aug. 8, 2011, and is based upon and claims the benefit of priority of Japanese Priority Application No. 2010-183671 filed on Aug. 19, 2010, the entire contents of which are hereby incorporated herein by reference.

TECHNICAL FIELD

The present invention relates to an information processing apparatus and an information processing system, and more particularly to an information processing apparatus and an information processing system for supporting install operations.

BACKGROUND ART

In recent years, in embedded devices such as image forming apparatuses (hereinafter, simply referred to as "devices"), new applications can be installed after shipment. However, to prevent the cost of the device itself from increasing, the memory capacity of the device tends to be limited compared to general-purpose computers.

Therefore, when plural applications installed in the device are operated simultaneously, the device is more apt to run out of available memory compared to general-purpose computers.

Thus, in the conventional technology, there have been proposals for determining whether an application can be installed in an image forming apparatus based on the sum of memory amounts used by the application to be installed and the memory amounts of applications already installed in the image forming apparatus (see, for example, patent document 1).

However, the total memory amount used when plural applications are simultaneously operated does not necessarily correspond to the sum of memory amounts used when the respective applications are operated individually. For example, the memory usage of a library shared by plural applications may not be proportionate to the number of applications operated simultaneously.

When the memory usage of the library is substantially fixed but the total memory usage of the applications is obtained by a simple sum, the memory usage of the library may be redundantly added. Accordingly, the memory amount obtained by a simple sum may be greater than the actual memory usage of the applications. In this case, the image forming apparatus may reject installing an additional application even when the additional application can actually be installed.

Meanwhile, when the memory usage of the library exponentially increases with the number of applications that are simultaneously operated, but the total memory usage of the applications is obtained by a simple sum, the simple sum may be less than the actual memory usage of the applications. In this case, the image forming apparatus may allow an additional application to be installed even when it is inappropriate to do so.

Patent Document 1: Japanese Laid-Open Patent Application No. 2006-285871

Disclosure of Invention

The present invention has been made in view of the above-described problems, and it is an object of at least one embodiment of the present invention to provide an information processing apparatus and an information processing system capable of improving the precision in determining whether a program can be installed.

An aspect of the present invention provides an information processing apparatus including a coexistence condition storage unit configured to store combination information relevant to combinations of different types of first programs that can be installed in a device, the combination information including memory consumption amounts of the combinations; an install information receiving unit configured to receive an install target first program selected as an install target and device information relevant to the device selected as an install destination of the install target first program; and a validity determining unit configured to determine validity of installing the install target first program in the device by determining, by referring to the combination information in the coexistence condition storage unit, a predicted memory consumption amount corresponding to a first combination including the install target first program and an existing first program that is installed in the device and indicated in the device information, and by comparing the predicted memory consumption amount obtained as a determination result with a device memory consumption amount of the device selected as the install destination indicated in the device information.

An aspect of the present invention provides an information processing system comprising an information processing apparatus and a device, wherein the information processing apparatus includes a coexistence condition storage unit configured to store combination information relevant to combinations of different types of first programs that can be installed in the device, the combination information including memory consumption amounts of the combinations; an install information receiving unit configured to receive an install target first program selected as an install target and device information relevant to the device selected as an install destination of the install target first program, the device information being acquired from the device selected as the install destination; and a validity determining unit configured to determine validity of installing the install target first program in the device by determining, by referring to the combination information in the coexistence condition storage unit, a predicted memory consumption amount corresponding to a first combination including the install target first program and an existing first program that is installed in the device and indicated in the device information, and by comparing the predicted memory consumption amount obtained as a determination result with a device memory consumption amount of the device selected as the install destination indicated in the device information.

An aspect of the present invention provides a non-transitory computer-readable storage medium with an executable program stored therein, wherein the program instructs a processor of a computer to execute a method including receiving an install target first program selected as an install target and device information relevant to a device selected as an install destination of the install target first program; and determining validity of installing the install target first program in the device, the determining of the validity including determining a predicted memory consumption amount corresponding to a first combination including the install target first program and an existing first program that is installed in the device and indicated in the device information, the predicted memory consumption amount being determined by referring to a coexistence condition storage unit storing combination information relevant to combinations of different types of first programs that can be installed in the device, the combination information including memory consumption amounts of the combinations, the determining of the validity further including comparing the predicted memory consumption amount obtained as a determination result with a device memory consumption amount of the device selected as the install destination indicated in the device information.

BEST MODE FOR CARRYING OUT THE INVENTION

Figure 1:
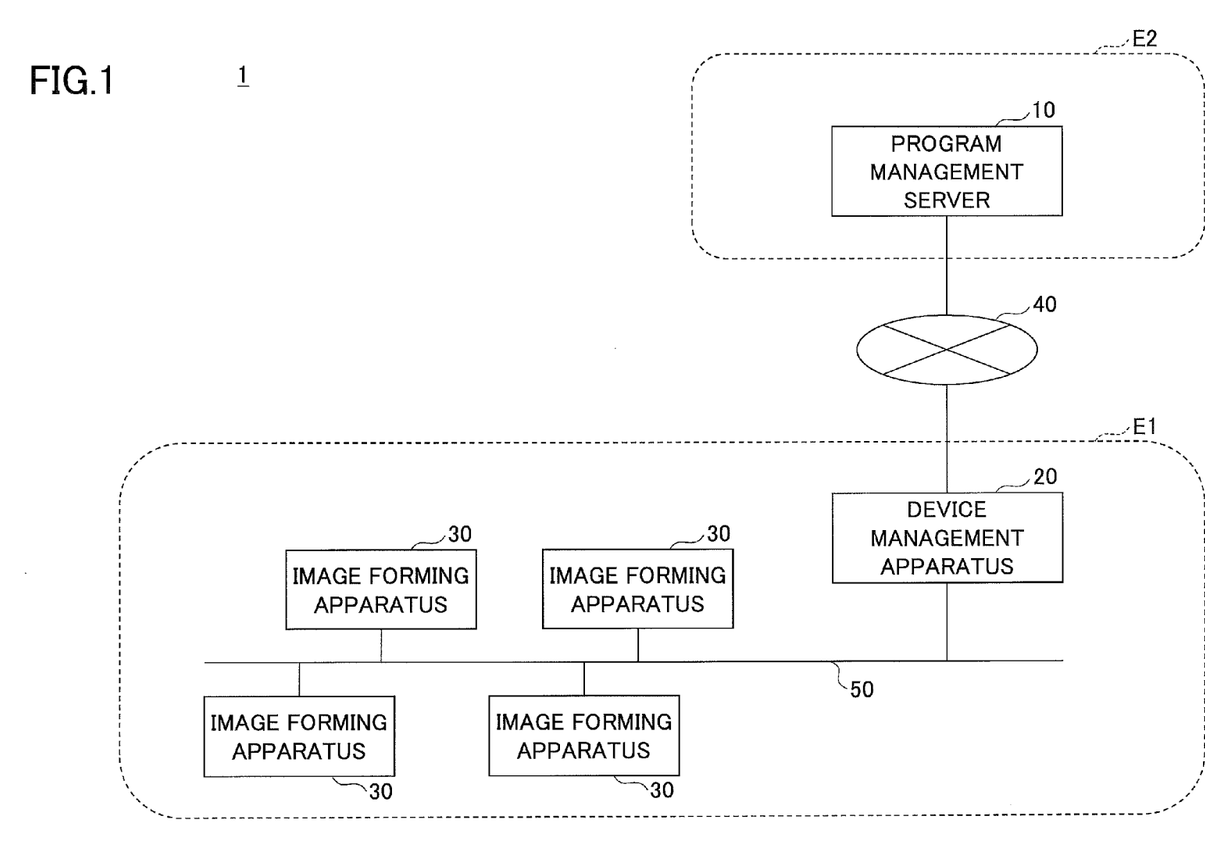
FIG. 1 illustrates an example of an install support system according to an embodiment of the present invention.

Embodiments of the present invention are described below with reference to the accompanying drawings. FIG. 1 illustrates an example of an install support system according to an embodiment of the present invention.

In an install support system 1, a program management server 10 and a device management apparatus 20 are connected via a network 40 such as the Internet. Furthermore, the device management apparatus 20 and one or more image forming apparatuses 30 are connected via a network 50 (wired or wireless) such as LAN (Local Area Network).

The device management apparatus 20 and the image forming apparatus 30 are located in, for example, a user environment E1. The user environment E1 is a system environment of a user (customer) of the image forming apparatus 30.

The image forming apparatus 30 is an example of a device, such as a multifunction peripheral that implements multiple functions including printing, scanning, a copying, and fax transmission/reception in a single casing. However, the image forming apparatus 30 may not necessarily be a multifunction peripheral. The image forming apparatus 30 may be a device that implements a single function, such as a printer or a scanner. Furthermore, a device other than an image forming apparatus may be used as the image forming apparatus 30. Functions of the image forming apparatus 30 may be expanded as needed, by adding or updating programs. In the present embodiment, programs are generally divided into application programs (hereinafter, simply referred to as "applications") and platforms. An application is an example of a first program, which is an upper-level program that is directly operated by a user and that causes the image forming apparatus 30 to execute a predetermined job. A platform is an example of a second program, which is a group of lower-level program modules for implementing an execution environment of applications. A platform is shared by plural application programs.

The device management apparatus 20 is a computer such as a PC (Personal Computer) for controlling processes of installing programs in the image forming apparatus 30.

The program management server 10 is a computer such as a PC for managing programs that can be installed in the image forming apparatus 30 and for determining whether an application can be installed in the image forming apparatus 30 (or whether it is valid (or possible or appropriate) to install the application. The program management server 10 is located in, for example, a manufacturer environment E2. The manufacturer environment E2 is a system environment at the manufacturer of the image forming apparatus 30.

Figure 2:
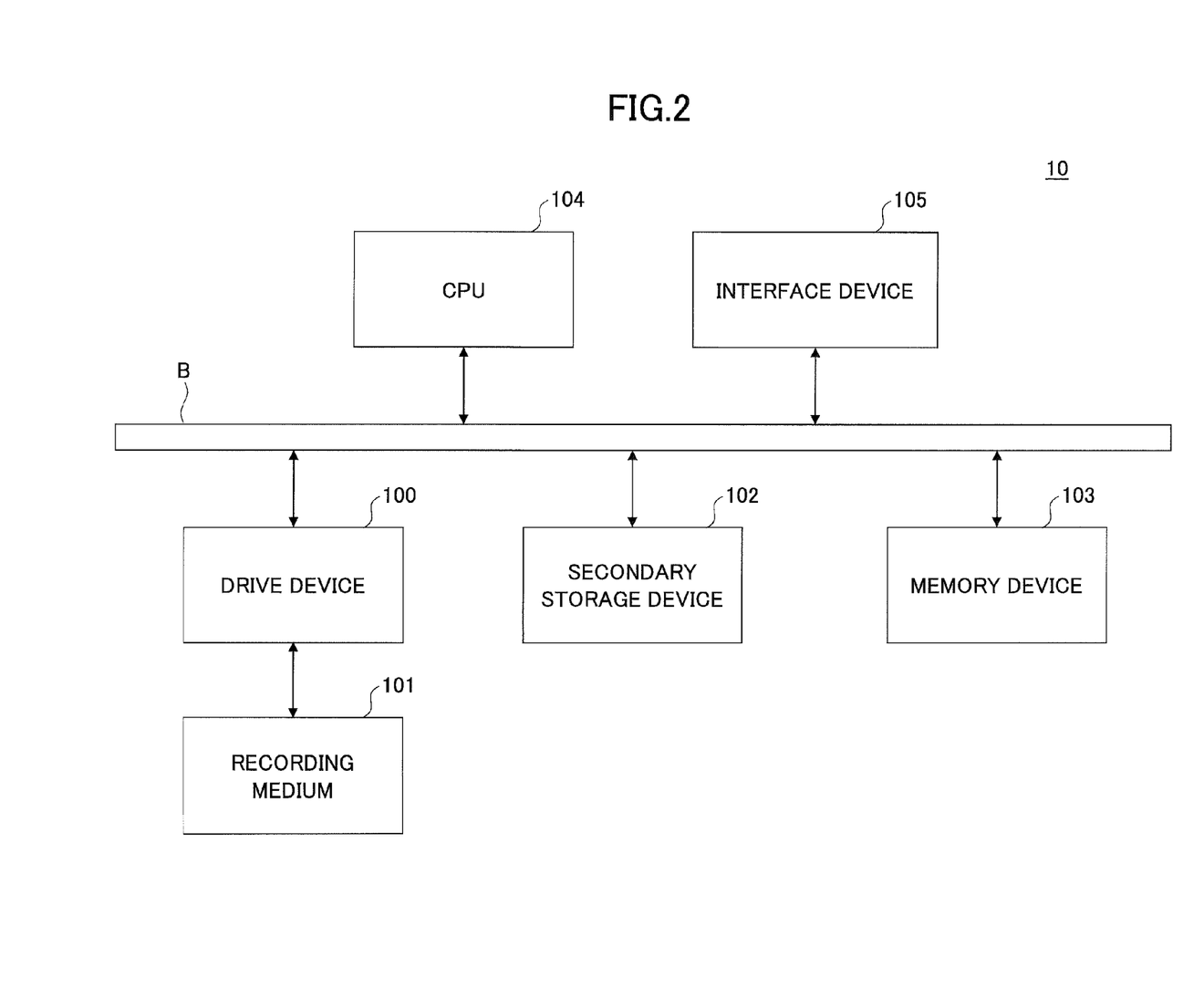
FIG. 2 illustrates an example of a hardware configuration of a program management server according to an embodiment of the present invention.

FIG. 2 illustrates an example of a hardware configuration of the program management server 10 according to an embodiment of the present invention. The program management server 10 illustrated in FIG. 2 includes a drive device 100, a secondary storage device 102, a memory device 103, a CPU 104, and an interface device 105, which are interconnected by a bus B.

Programs for implementing processes at the program management server 10 are provided by a recording medium 101 such as a CD-ROM. When the recording medium 101 having a program recorded therein is set in the drive device 100, the program is installed in the secondary storage device 102 from the recording medium 101 via the drive device 100. However, programs may not necessarily be installed from the recording medium 101; programs may be downloaded from other computers via a network. The secondary storage device 102 stores the installed programs as well as necessary files and data.

The memory device 103 reads a program from the secondary storage device 102 and stores the read program, in response to an instruction to activate the program. The CPU 104 executes functions relevant to the program management server 10 according to programs stored in the memory device 103. The interface device 105 is used for connecting to a network.

Figure 3:
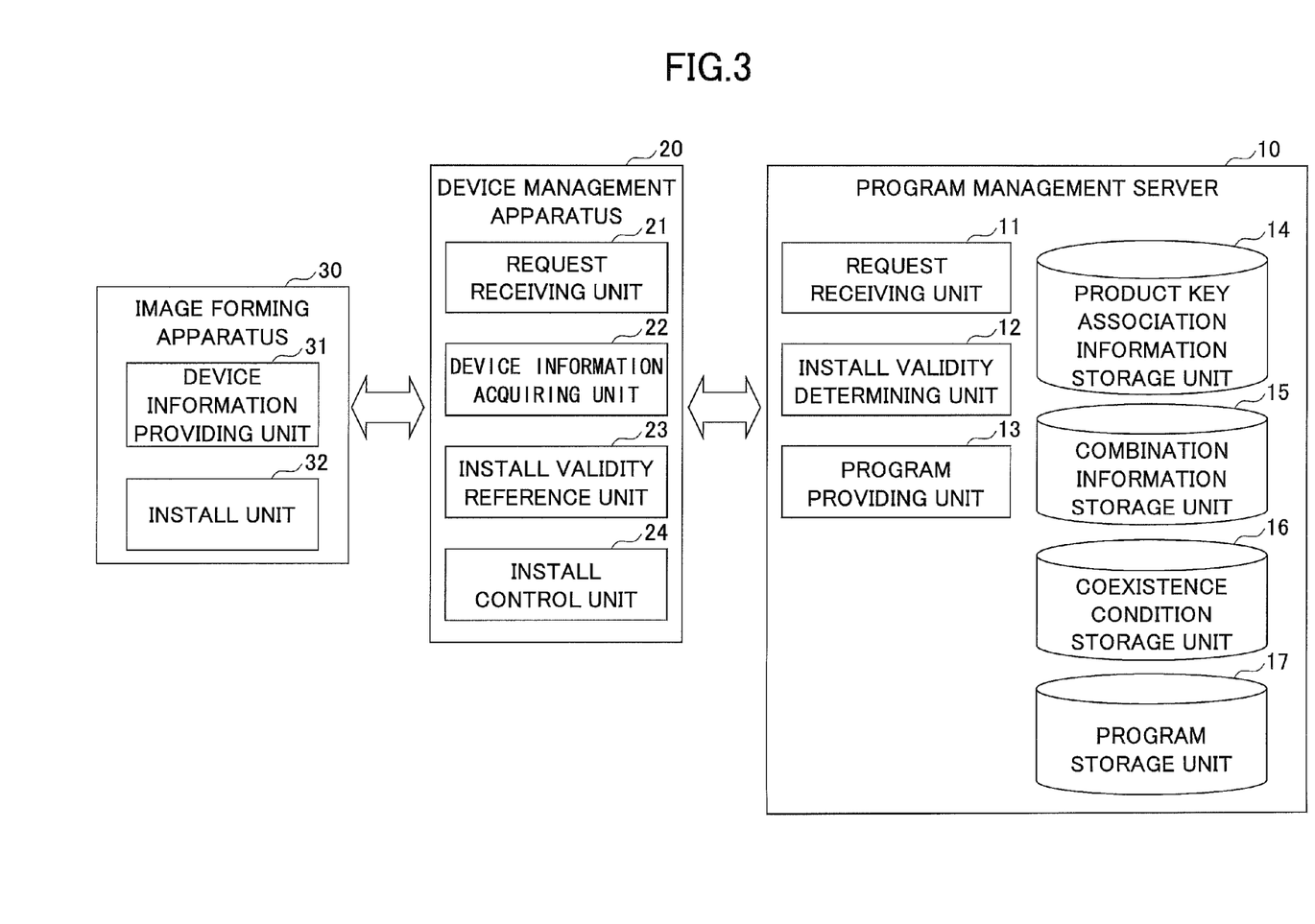
FIG. 3 is an example of a functional block diagram of an install support system according to an embodiment of the present invention.

FIG. 3 is an example of a functional block diagram of an install support system according to an embodiment of the present invention.

As illustrated in FIG. 3, the device management apparatus 20 includes a request receiving unit 21, a device information acquiring unit 22, an install validity reference unit 23, and install control unit 24. These units are implemented as programs installed in the device management apparatus 20, which are executed by a CPU of the device management apparatus 20.

The request receiving unit 21 causes a display device of the device management apparatus 20 to display a screen image, and receives an instruction to install an application in the image forming apparatus 30 from the operator via the displayed screen image.

The device information acquiring unit 22 acquires information relevant to the image forming apparatus 30 (hereinafter, "device information") from the image forming apparatus 30 selected as an install destination in the install instruction (hereinafter, "target device").

The install validity reference unit 23 inquires (refers to) the program management server 10 of whether it is valid to install, in the target device, the application (hereinafter, "target application") selected as an install target in the install instruction.

When the install validity reference unit 23 determines that the installing of the target application is valid, the install control unit 24 downloads the target application from the program management server 10 and controls the process of installing the target application in the target device.

The image forming apparatus 30 includes a device information providing unit 31 and an install unit 32. In response to a request to acquire device information from the device management apparatus 20, the device information providing unit 31 collects information to be included in the device information from inside the image forming apparatus 30, and returns the device information including the collected information to the device management apparatus 20.

The install unit 32 executes the process of installing the target application, according to instructions from the install control unit 24 of the device management apparatus 20.

The program management server 10 includes a request receiving unit 11, an install validity determining unit 12, a program providing unit 13, a product key association information storage unit 14, a combination information storage unit 15, a coexistence condition storage unit 16, and a program storage unit 17.

The request receiving unit 11 receives requests from the device management apparatus 20. Examples of the requests include a request for determining the validity to install an application and a request to download a program.

The install validity determining unit 12 determines the validity of installing an application in response to a request to determine the validity of installing an application from the device management apparatus 20.

The program providing unit 13 returns a program specified as the download target, in response to a request to download the program from the device management apparatus 20.

The product key association information storage unit 14 stores association information of product keys and product IDs, with the use of the secondary storage device 102. The product ID is an ID (identifier) given to each type of program. The product ID may be unique to each product type. For example, assuming that there is an application A and an application B, the application A and the application B have different product IDs. Meanwhile, a product key is an identifier that is issued (or assigned) every time an application is purchased. A product key is used as information for certifying a purchase of an application. That is to say, when an application is purchased, the entity of the application is not distributed to the purchaser, but instead, a product key is distributed to the purchaser. The product key may be unique to each purchase of an application. Therefore, plural product keys may be issued for the same product ID (application). For example, when an application is purchased, a product key assigned to the purchase is associated with the product ID of the application and recorded in the product key association information storage unit 14.

The combination information storage unit 15 stores, with the use of the secondary storage device 102, list information including combinations of applications that can coexist with each other, among the applications managed by the program management server 10 (i.e., applications that can be installed in the image forming apparatus 30). When applications can coexist, it means that the applications can be installed together in a single image forming apparatus 30. Examples of cases where applications are cannot coexist with each other are when the environments in which the applications can be operated (e.g., versions of platforms) are exclusive of each other, and when one application cannot be operated when the other application is operated.

The coexistence condition storage unit 16 stores, with the use of the secondary storage device 102, the conditions that need to be fulfilled (or that are preferably fulfilled) for applications of a combination to coexist with each other.

The program storage unit 17 stores the entity of each program (program file) in association with a product ID, with the use of the secondary storage device 102.

Figure 4:
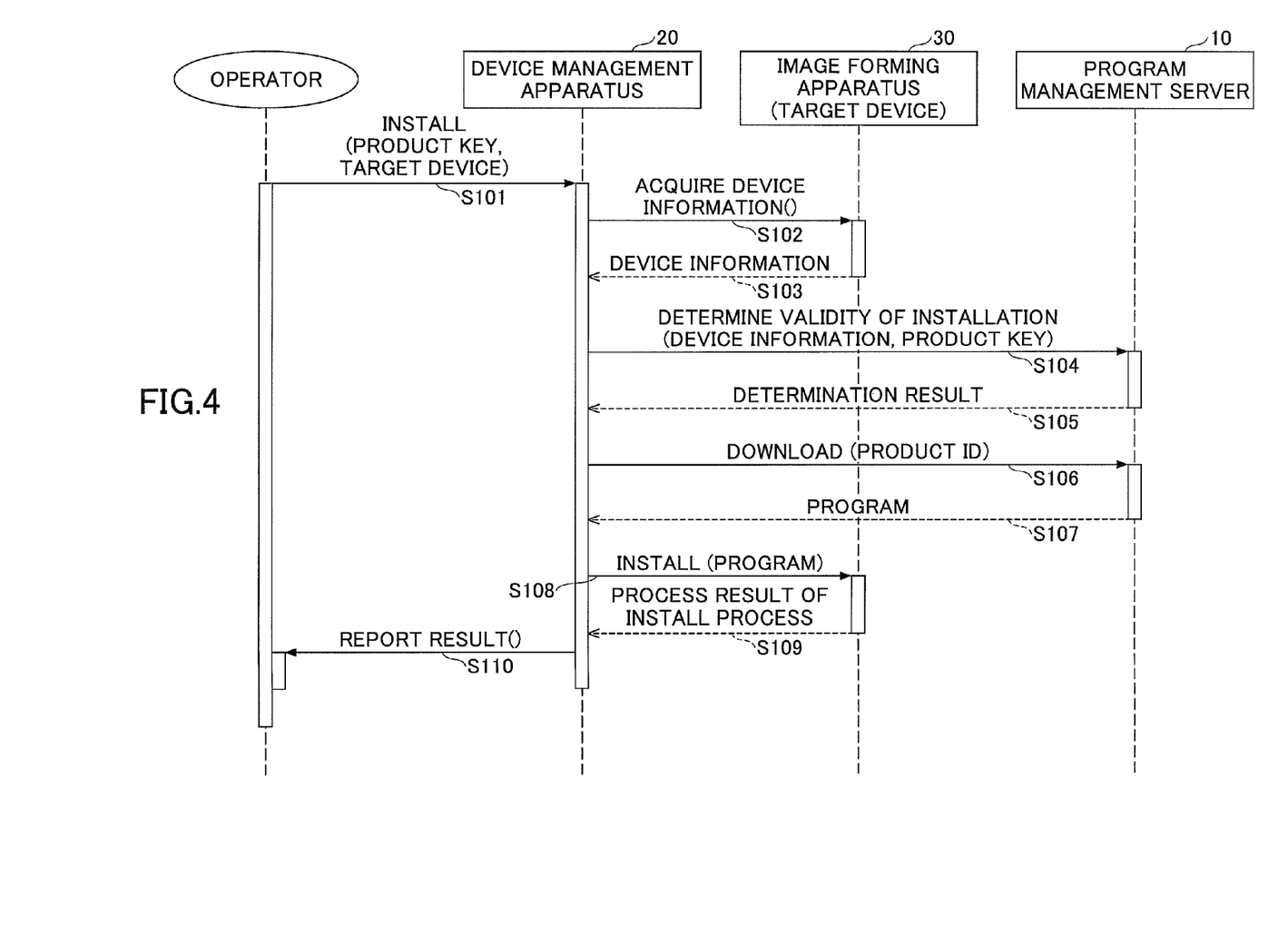
FIG. 4 is a sequence diagram for describing processing procedures of a process of installing a program in an image forming apparatus performed by the install support system.

Hereinafter, a description is given of processing procedures of the install support system 1. FIG. 4 is a sequence diagram for describing processing procedures of a process of installing a program in the image forming apparatus 30 performed by the install support system 1. In FIG. 4, the device management apparatus 20 is the operation target.

In step S101, the request receiving unit 21 of the device management apparatus 20 receives, from an operator, an instruction to install a target application, specifying a target device and a product key of the target application. For example, the target device is specified as the operator selects an install destination from a screen image including a list of image forming apparatuses 30 displayed by the request receiving unit 21. List information of the image forming apparatuses 30 may be saved in the device management apparatus 20 in advance, or searched in the network 50 according to input of the operator. As the target device is specified (selected), the IP address of the target device is identified.

For example, the product key is specified as an operator inputs a product key that is purchased in advance, in a screen image for inputting product keys displayed by the request receiving unit 21.

Plural target devices and plural product keys may be specified by the operator.

Next, the device information acquiring unit 22 transmits a request to acquire the device information to the target device (to the IP address of the target device) (step S102). The device information providing unit 31 of the target device collects information configuring the device information from inside the target device, and returns the device information including the collected information (step S103).

Figure 5:
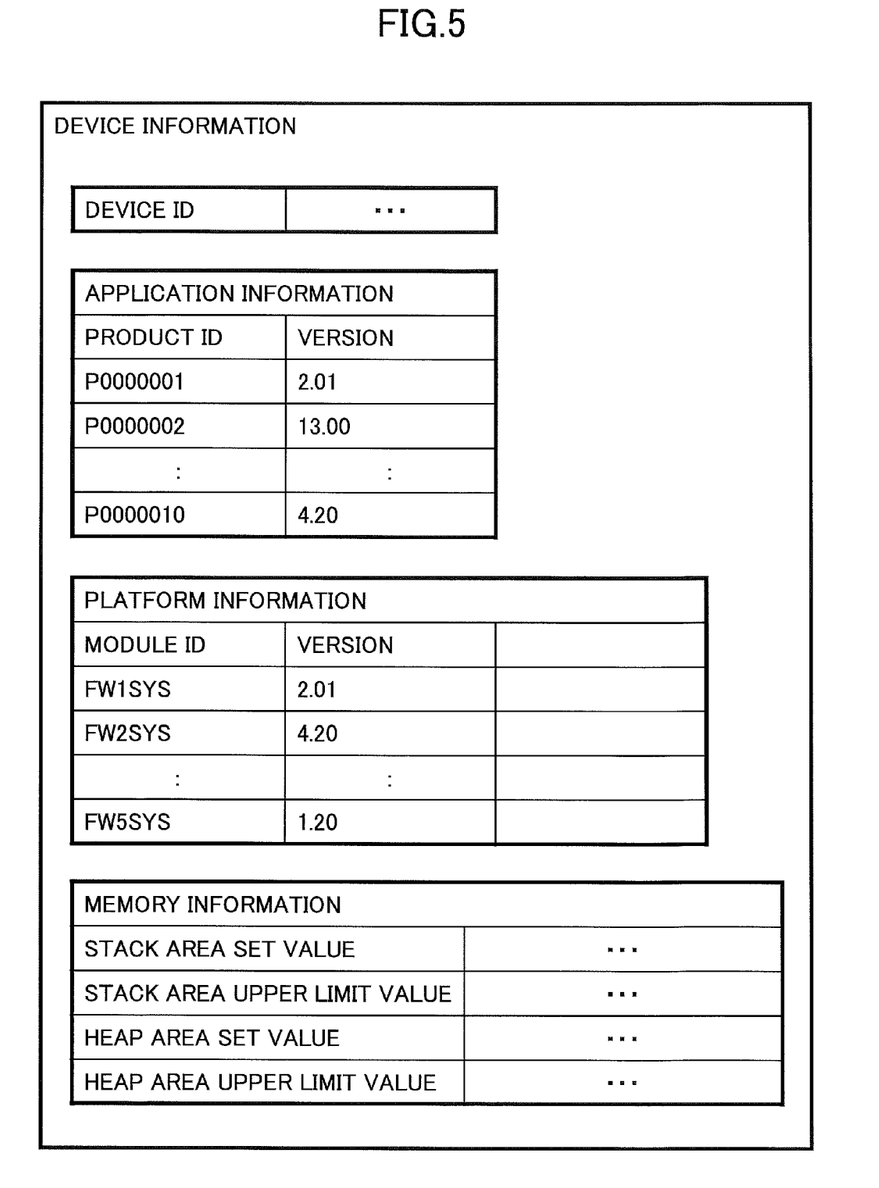
FIG. 5 illustrates a configuration example of device information.

FIG. 5 illustrates a configuration example of device information. As illustrated in FIG. 5, device information acquired from a single image forming apparatus 30 includes a device ID, application information, platform information, and memory information.

The device ID is an identifier of the image forming apparatus 30. An IP address may be used as the device ID. The application information includes product IDs and versions of the applications installed in the image forming apparatus 30. The platform information includes module IDs and versions of the program modules configuring the platform installed in the image forming apparatus 30. A module ID is an identifier given to each type of program module. A module ID may be unique to each type of program module. The memory information is relevant to the memory capacity of the image forming apparatus 30 and includes a stack area set value, a stack area upper limit value, a heap area set value, and a heap area upper limit value. The stack area set value expresses the size of a stack area set in the image forming apparatus 30. The stack area upper limit value expresses the upper limit of the size of the stack area in the image forming apparatus 30. The heap area set value expresses the size of the heap area set in the image forming apparatus 30. The heap area upper limit value expresses the upper limit of the size of the heap area in the image forming apparatus 30. The set values of the stack area and the heap area may be changed within the respective upper limits. The image forming apparatus 30 executes a program within the set values.

In the device management apparatus 20, when the device information acquiring unit 22 receives device information, the install validity reference unit 23 specifies the input product key and device information of the target device, and transmits a request to determine the validity of installing the target application to the program management server 10 (step S104). The determination request is received by the request receiving unit 11 at the program management server 10.

Next, the install validity determining unit 12 of the program management server 10 determines the validity of installing the target application based on the product key and device information included in the determination request, the product key association information, the combination information storage unit 15, and the coexistence condition storage unit 16, and returns the determination result to the install validity reference unit 23 of the device management apparatus 20 (step S105). When it is determined that it is valid (or possible) to install the target application, at least the product ID of the target application is included in the determination result.

When a determination result indicating that it is valid to install the target application is returned, the install control unit 24 of the device management apparatus 20 specifies the product ID of the target application according to the determination result, and transmits a download request to the program management server 10 (step S106). Depending on the contents of the determination result, the module ID of a module that is part of the platform may be specified as a download target.

The program providing unit 13 of the program management server 10 acquires, from the program storage unit 17, a program corresponding to the product ID specified in the download request, and returns the program to the install control unit 24 (step S107).

Next, the install control unit 24 transmits the install instruction including the returned program (target application, etc.) to the target device (step S108). The install unit 32 of the image forming apparatus 30 executes a process of installing the program received together with the install instruction, and returns a process result of the install process (information indicating whether the install process is successful) to the install control unit 24 (step S109. The install process may include a process of updating (upgrading) a program that is already installed.

The install control unit 24 that has received the process result of the install process causes the display device of the device management apparatus 20 to display a screen image according to the process result (step S110).

Next, a detailed description is given of processing procedures of an install validity determination process executed by the install validity determining unit 12 of the program management server 10, in response to the install validity determination request of step S104.

Figure 6A:
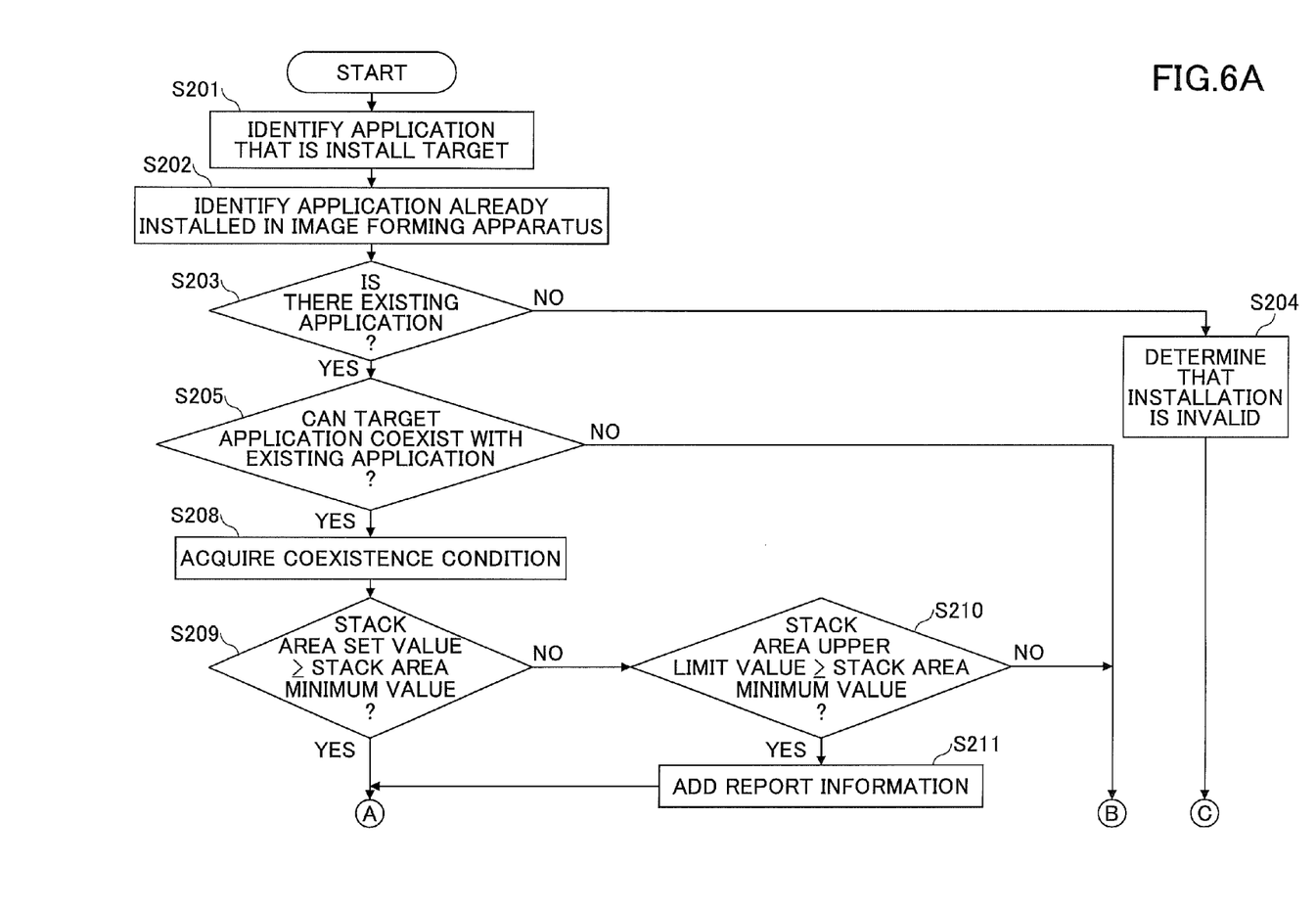
FIGS. 6A and 6B illustrate a flowchart for describing an example of processing procedures of an install validity determination process.
Figure 6B:
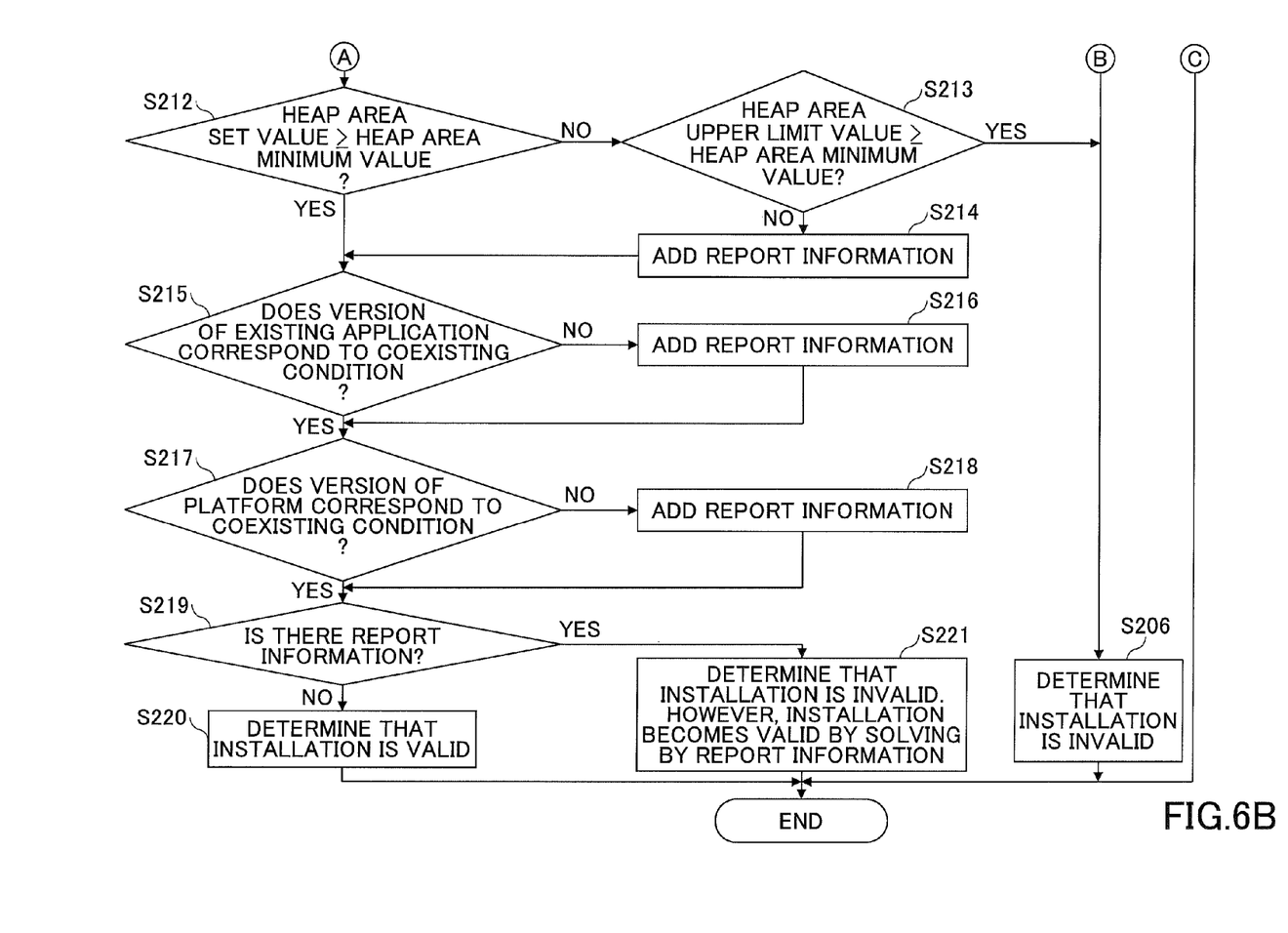

FIGS. 6A and 6B illustrate a flowchart for describing an example of processing procedures of an install validity determination process.

In step S201, the install validity determining unit 12 identifies, with the use of the product key association information storage unit 14, the product ID corresponding to the product key received from the device management apparatus 20. Identifying the product ID means identifying the target application.

Figure 7:
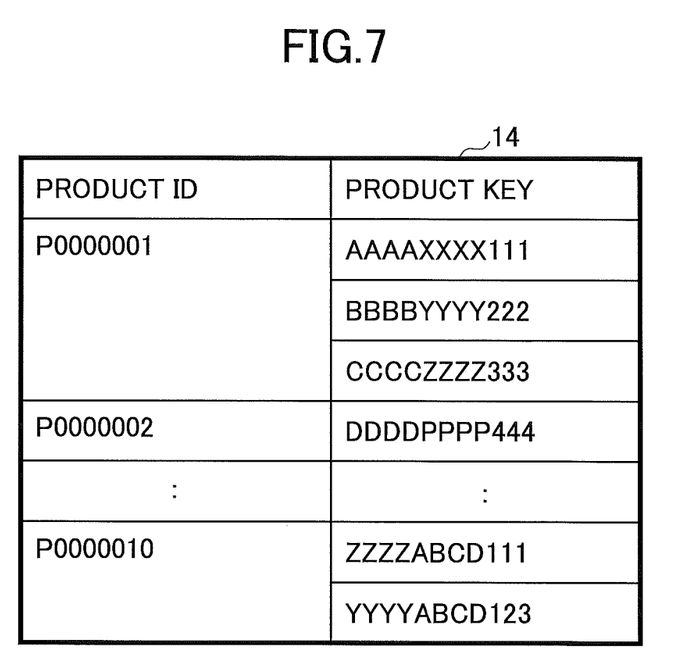
FIG. 7 illustrates a configuration example of a product key association information storage unit.

FIG. 7 illustrates a configuration example of the product key association information storage unit 14. In FIG. 7, the product key association information storage unit 14 stores product keys that are issued every time the applications corresponding to product IDs are purchased. The product keys are stored in association with the corresponding product IDs.

Next, the install validity determining unit 12 identifies the product ID of an application (hereinafter, "existing application") already installed in the target device, based on application information included in the device information received from the device management apparatus 20 (step S202).

When there are no existing applications, i.e., when no applications are installed in the target device (NO in step S203), the install validity determining unit 12 determines that the installation is valid (step S204), and ends the process of FIGS. 6A and 6B. Thus, in this case, in step S105 of FIG. 4, the install validity determining unit 12 returns, to the device management apparatus 20, a determination result including an indication that installation is valid and the product ID of the target application.

Next, the install validity determining unit 12 searches for combinations of the target application and existing applications in the combination information storage unit 15, to determine whether the target application can coexist with existing applications (step S205).

Figure 8:
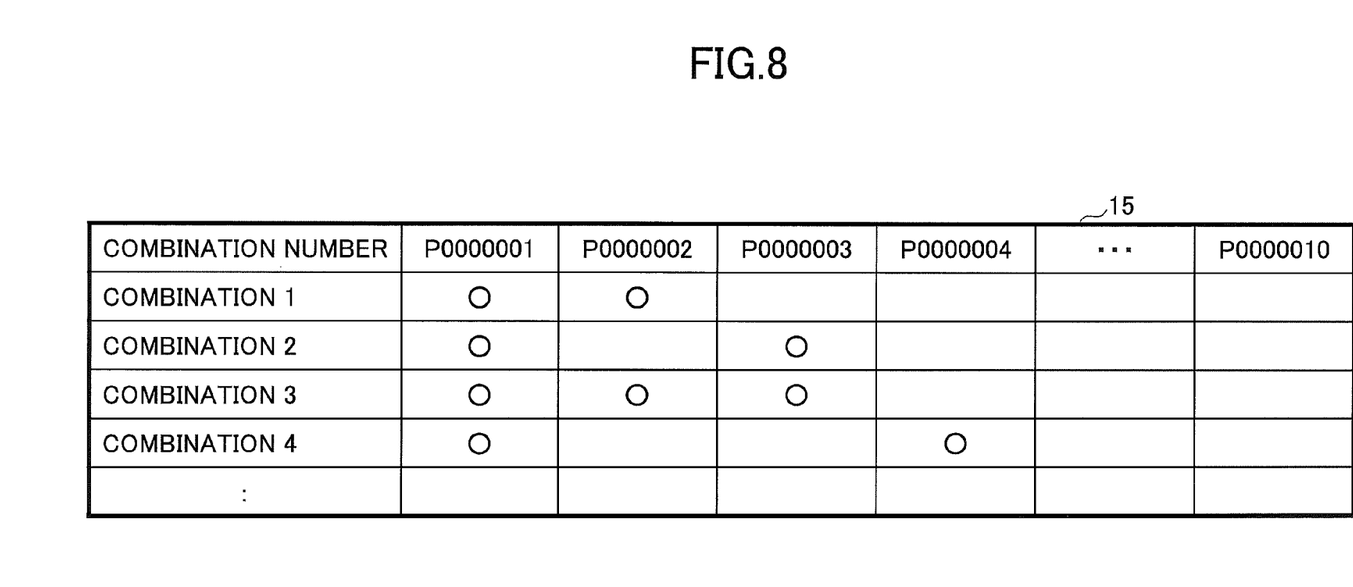
FIG. 8 illustrates a configuration example of a combination information storage unit.

FIG. 8 illustrates configuration example of the combination information storage unit 15. As illustrated in FIG. 8, the combination information storage unit 15 stores combinations of applications that can coexist with each other among all applications managed by the program management server 10 (i.e., all applications that can be installed in the image forming apparatus 30). Specifically, the combination numbers of the combinations and the product IDs of the applications belonging to the combinations are stored in the combination information storage unit 15. Therefore, in step S205, the install validity determining unit 12 determines whether the combination information storage unit 15 includes records corresponding to a combination of product IDs of all target applications and product IDs of all existing applications. When there is no such record, the install validity determining unit 12 determines that coexistence is impossible. When there is such a record, the install validity determining unit 12 determines that coexistence is possible.

The records of the combination information storage unit 15 are registered by the developer of the applications. Specifically, the developer installs, in the image forming apparatus 30, all applications belonging to each combination, and confirms the operations of the applications. When there are no problems with any of the applications as a result of the operation confirmation, the developer determines that the applications belonging to the combination can coexist with each other and adds a record indicating the combination in the combination information storage unit 15.

When the install validity determining unit 12 determines that coexistence is impossible (NO in step S205), the install validity determining unit 12 determines that installation is invalid (step S206). In this case, the install validity determining unit 12 returns a determination result indicating that the installation is invalid to the device management apparatus 20. The device management apparatus 20 ends the install process according to the determination result.

There are a large number of applications available in the market, and there may be an immense number of combinations of applications. Thus, it may be difficult to actually confirm the operations of all combinations. In a case where a large number of applications have been shipped, the operation confirmation may only be performed on the important applications for each combination. The combinations stored in the combination information storage unit 15 ensure that the applications in the combinations can coexist with each other. When an application is not included in the combination information storage unit 15, it does not immediately mean that this application cannot be installed. The install validity determining unit 12 determines that installation of this application is not ensured. In this case, the install validity determining unit 12 returns, to the device management apparatus 20, a determination result including an indication that installation of the target application is not ensured and a product ID of the target application. When the determination result is received, the request receiving unit 21 of the device management apparatus 20 causes the device management apparatus 20 to display a screen image indicating that installation of the target application is not ensured, and prompts the user to select whether to continue the installation operation. When the user selects to continue the installation operation, steps S106 and onward are executed. However, in another example, when a determination result indicating that installation of the target application is not ensured, the install validity reference unit 23 may abort the install process.

When the install validity determining unit 12 determines that coexistence is possible (YES in step S205), the install validity determining unit 12 acquires, from the coexistence condition storage unit 16, coexistence conditions of the combination, based on the combination number of the combination indicated in the corresponding record (step S208).

Figure 9:
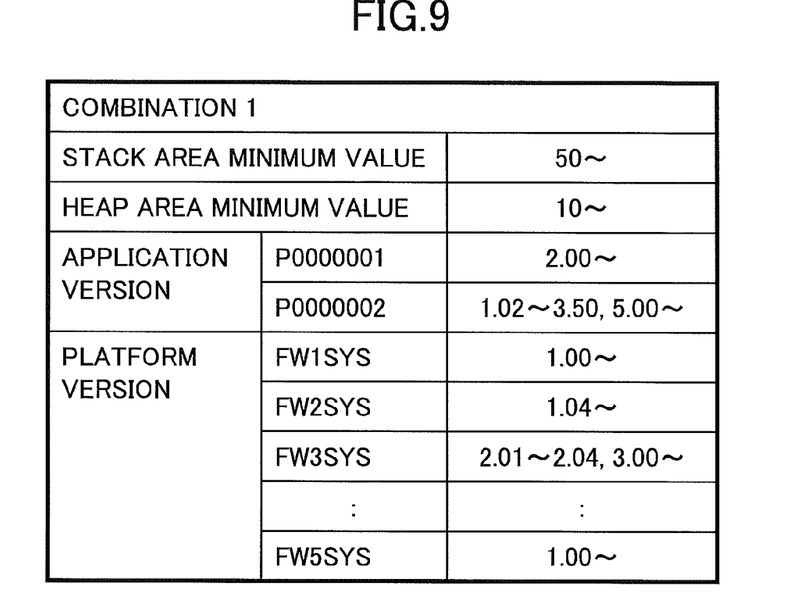
FIG. 9 illustrates a configuration example of a coexistence condition.

FIG. 9 illustrates a configuration example of a coexistence condition. FIG. 9 illustrates a coexistence condition for combination 1. Coexistence conditions are registered in the coexistence condition storage unit 16 for the respective combinations registered in the combination information storage unit 15.

The coexistence condition is to be satisfied when all applications belonging to the combination relevant to the coexistence condition are installed in the target device. In the present embodiment, items included in the coexistence condition include a stack area minimum value, a heap area minimum value, application versions, and platform versions.

The stack area minimum value is the minimum value of the stack area that the target device is required to have. The heap area minimum value is the minimum value of the heap area that the target device is required to have. The application versions indicate version information limiting the versions of the applications belonging to the combination. That is to say, if an application does not correspond to any of the versions recorded in the application versions, the coexistence condition is not satisfied. The platform versions indicate version information limiting the versions of program modules of the platforms used by the applications belonging to the combination.

Values of the coexistence condition are set by the developer of the applications, for example. Specifically, the developer measures the memory amounts of the stack area and heap area used when all applications belonging to the combination are simultaneously executed, during the operation confirmation executed when adding a record to the combination information storage unit 15. As for applications having plural versions, the operation confirmation is performed on the respective versions.

There are a large number of applications available in the market, and there may be an immense number of combinations of applications. Thus, it may be difficult to actually confirm the operations of combinations of all versions of all applications. In a case where a large number of versions have been shipped, the operation confirmation may only be performed on the important versions. The combinations stored in the combination information storage unit 15 ensure that the versions in the combinations can coexist with each other.

Next, the install validity determining unit 12 determines whether the stack area set value included in the device information of the target device is greater than or equal to the stack area minimum value included in the acquired coexistence condition (hereinafter, "target coexistence condition") (step S209). When the stack area set value included in the device information of the target device is less than the stack area minimum value (NO in step S209), the install validity determining unit 12 determines whether the stack area upper limit value included in the device information of the target device is greater than or equal to the stack area minimum value included in the target coexistence condition (step S210). When the stack area upper limit value included in the device information of the target device is less than the stack area minimum value included in the target coexistence condition (NO in step S210), the install validity determining unit 12 determines that the installation is invalid (step S206).

When the stack area upper limit value included in the device information of the target device is greater than or equal to the stack area minimum value included in the target coexistence condition (YES in step S210), the install validity determining unit 12 adds the stack area minimum value included in the target coexistence condition to the report information to be returned together with the determination result. By changing the stack area set value of the target device to a value that is greater than or equal to the stack area minimum value, the installation of the target application becomes possible. This is the purpose of adding the stack area minimum value to the report information to be notified to the operator.

When the result of step S209 is YES, or after step S211, the install validity determining unit 12 executes, on the heap area, the same process as that performed on the stack area, in steps S212 through S214.

In step S215, the install validity determining unit 12 determines, for the respective existing applications, whether the version information included in the application information of the device information and the version information included in the application version of the target coexistence condition correspond to each other. The version information in the coexistence condition may be range-specified or listed. In this case, the determination result is affirmative if the version information in the device information is included in any of the version information items that are range-specified or listed in the coexistence condition.

When there is at least one existing application where the version information included in the application information of the device information and the version information included in the target coexistence condition do not correspond to each other (NO in step S215), the install validity determining unit 12 adds the product ID and the version information included in the target coexistence condition to the report information for the corresponding existing application (step S216). By updating (upgrading) the existing application, installation of the target application becomes possible. This is the purpose of adding the product ID and the version information included in the target coexistence condition to the report information to be notified to the operator.

When the result of step S215 is YES, or after step S216, the install validity determining unit 12 determines whether the version information included in the device information corresponds to the version information of the respective program modules included in the platform information of the coexistence condition (step S217). In step S217, the install validity determining unit 12 also determines whether the module ID included in the platform version of the coexistence condition is included in the platform information of the device information. That is to say, the install validity determining unit 12 determines whether the program module set in the coexistence condition is already installed in the target device.

When there is at least one program module where the version information included in the platform information of the device information and the version information included in the platform version in the target coexistence condition do not correspond to each other (NO in step S217), the install validity determining unit 12 adds the module ID and the version information included in the target coexistence condition to the report information for the corresponding program module (step S218). By updating (upgrading) the program module, installation of the target application becomes possible. This is the purpose of adding the module ID and the version information included in the target coexistence condition to the report information to be notified to the operator.

When at least one module ID included in the platform version of the coexistence condition is not included in the platform information of the device information, the corresponding module ID and version information are acquired from the coexistence condition and are added to the report information.

Figure 10:
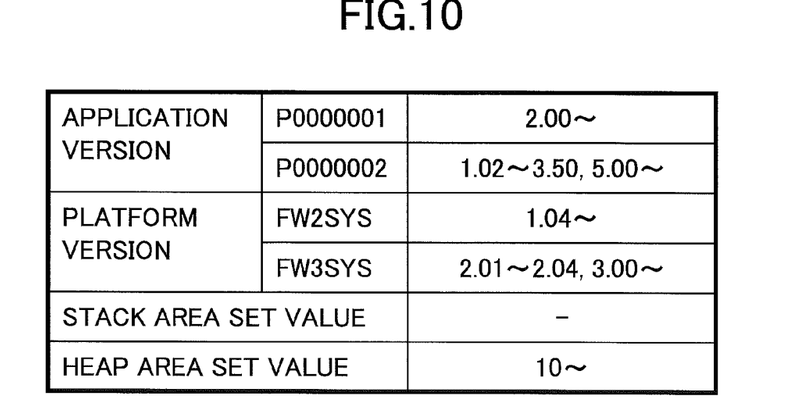
FIG. 10 illustrates a configuration example of report information.

For example, the report information is generated in a format as illustrated in FIG. 10. FIG. 10 illustrates a configuration example of the report information. As illustrated in FIG. 10, the report information includes items of application versions, platform versions, a stack area set value, and a heap area set value. The record of the application version (product ID and version information) is added in step S216. The record of the platform version (module ID and version information) is added in step S218. The record of the stack area set value is added in step S211. The record of the heap area set value is added in step S214.

When the result of step S217 is YES, or after step S218, the install validity determining unit 12 determines whether at least one record is added to the report information (step S219). That is to say, the install validity determining unit 12 determines whether there is an item (condition) that is not satisfied in the target coexistence condition.

When there are no records added to the report information (NO in step S219), the install validity determining unit 12 determines that the installation is valid (step S220). Accordingly, in this case, in step S105 (FIG. 4), a determination result indicating that the installation is valid and the product ID of the target application are returned.

Meanwhile, when there is at least one record included in the report information (YES in step S219), the install validity determining unit 12 determines that the installation is invalid (step S221). However, in this case, by changing the status of the target device so that the contents (conditions) specified in the report information are satisfied, the installation becomes valid. Therefore, in order to notify this to the operator, in step S105 (FIG. 4), the determination result indicating that installation is invalid, the product ID of the target application, and the report information are returned.

When the report information is received, the install validity reference unit 23 of the device management apparatus 20 causes the display device to display the report information. When a record relevant to the application version or the platform version is included in the report information, the install validity reference unit 23 causes the display device to display a screen image for prompting the operator to select whether to execute the process of updating an existing application or program module together with the process of installing the target application. When the operator selects to execute the process of updating an existing application or program module in this screen image, in step S106, the install control unit 24 of the device management apparatus 20 specifies the product ID of the existing application or the module ID of the program module and the product ID of the target application, and transmits a download request to the program management server 10. The install control unit 24 installs, in the target device, the target application, the existing application, or the program module returned from the program management server 10 in response to the download request.

Furthermore, when the report includes a record relevant to the stack area set value or the heap area set value, the operator operates the target device to change the stack area set value or the heap area set value, and subsequently, the process of installing the target application is to be executed. Alternatively, when the stack area set value or heap area set value of the target device can be changed by network communications, the install control unit 24 changes the stack area set value or heap area set value of the target device to the value included in the report information by network communications, and subsequently, the target application may be downloaded and installed in the target device.

The device management apparatus 20 does not necessarily need to be provided. Functions of the device management apparatus 20 may be included in the image forming apparatus 30 or the program management server 10. In this case, the operator operates the operation panel of the target device to give install instructions.

In another example, all functions of the program management server 10 may be installed in the device management apparatus 20. If it is redundant to install the product key association information storage unit 14, the combination information storage unit 15, the coexistence condition storage unit 16, and the program storage unit 17 in the device management apparatus 20 in the respective user environments E1, these storage units may be uniformly managed in the program management server 10.

As described above, according to the present embodiment, the memory usage (consumption amount) when programs belonging to the same combination are simultaneously operated is managed for the respective combinations of programs (applications in the present embodiment) that are install targets. Accordingly, compared to the case of simply adding together the memory usage amounts of the programs, it is possible to improve the precision in predicting the memory usage and to improve the precision in determining the validity of installing programs.

Generally, programs are managed in terms of versions. In the present embodiment, the validity of combinations of versions is also managed in coexistence conditions. In this respect also, it is possible to improve the precision in determining the validity of installing programs.

According to an embodiment of the present invention, the precision in determining whether a program can be installed can be improved.

The present invention is not limited to the specific embodiments described herein, and variations and modifications may be made without departing from the scope of the present invention.

The invention claimed is:

1. A method performed by a computer, the method comprising:
  obtaining an identifier of a target first program selected as an install target, and device information of a device selected as an install destination of the target first program;
  determining whether at least one existing first program is already installed in the device based on whether the device information includes an identifier and a version of the existing first program, the target first program and the existing first program being different types of programs;
  when no existing first program is already installed in the device, determining that the target first program is installable in the device;
  when the existing first program is already installed in the device, referring to a storage memory unit, which stores combination information for each combination of first programs of different types that can coexist in the device in association with versions of the first programs in the combination, to determine whether the storage memory unit stores corresponding combination information for a combination of the target first program and the existing first program whose identifier is included in the device information;
  when the corresponding combination information is stored in the storage memory unit, determining whether the version of the existing first program in the device information matches the version of the existing first program stored in the storage memory unit in association with the corresponding combination information; and
  when the version of the existing first program in the device information does not match the version of the existing first program stored in the storage memory unit, determining that the target first program cannot coexist with the existing first program in the device and generating update report information for reporting that the existing first program needs to be updated to install the target first program in the device,
  wherein one or more sets of the combination information are stored in the storage memory unit for each of the first programs.

2. The method as claimed in claim 1,
  wherein the storage memory unit also stores, in association with the combination information, a list of second programs that are used by the combination of the first programs, and the device information also includes a list of existing second programs that are already installed in the device; and
  wherein the method further comprises:
    determining, by referring to the storage memory unit, a target second program that is to be used by the target first program and the existing first program in the corresponding combination information, and
    when the target second program is not included in the list of existing second programs in the device information, generating install report information for reporting that the target second program needs to be installed in the device.

3. The method as claimed in claim 1,
  wherein the storage memory unit also stores, in association with the combination information, a list of second programs that are used by the combination of the first programs and versions of the second programs, and the device information also includes a list of existing second programs that are already installed in the device and versions of the existing second programs; and
  wherein the method further comprises:
    determining, by referring to the storage memory unit, a target second program that is to be used by the target first program and the existing first program in the corresponding combination information and a version of the target second program, and
    when the target second program and the determined version of the target second program are not included in the device information, generating install report information for reporting that the target second program with the determined version needs to be installed in the device.

4. An apparatus, comprising:
  a storage memory unit that stores combination information for each combination of first programs of different types that can coexist in a device in association with versions of the first programs in the combination;
  an install information obtaining unit that obtains an identifier of a target first program selected as an install target, and device information of the device selected as an install destination of the target first program; and
  a validity determining unit that determines whether at least one existing first program is already installed in the device based on whether the device information includes an identifier and a version of the existing first program, the target first program and the existing first program being different types of programs, wherein
  when no existing first program is already installed in the device, the validity determining unit determines that the target first program is installable in the device;
  when the existing first program is already installed in the device, the validity determining unit determines whether the storage memory unit stores corresponding combination information for a combination of the target first program and the existing first program whose identifier is included in the device information;
  when the corresponding combination information is stored in the storage memory unit, the validity determining unit determines whether the version of the existing first program in the device information matches the version of the existing first program stored in the storage memory unit in association with the corresponding combination information;
  when the version of the existing first program in the device information does not match the version of the existing first program stored in the storage memory unit, the validity determining unit determines that the target first program cannot coexist with the existing first program in the device and generates update report information for reporting that the existing first program needs to be updated to install the target first program in the device; and the storage memory unit stores one or more sets of the combination information for each of the first programs.

5. The apparatus as claimed in claim 4, wherein
the storage memory unit also stores, in association with the combination information, a list of second programs that are used by the combination of the first programs;
the device information also includes a list of existing second programs that are already installed in the device;
the validity determining unit determines, by referring to the storage memory unit, a target second program that is to be used by the target first program and the existing first program in the corresponding combination information; and
when the target second program is not included in the list of existing second programs in the device information, the validity determining unit generates install report information for reporting that the target second program needs to be installed in the device.

6. The apparatus as claimed in claim 5, wherein
the storage memory unit also stores, in association with the combination information, a list of second programs that are used by the combination of the first programs and versions of the second programs;
the device information also includes a list of existing second programs that are already installed in the device and versions of the existing second programs;
the validity determining unit determines, by referring to the storage memory unit, a target second program that is to be used by the target first program and the existing first program in the corresponding combination information and a version of the target second program; and
when the target second program and the determined version of the target second program are not included in the device information, the validity determining unit generates install report information for reporting that the target second program with the determined version needs to be installed in the device.

7. A computer program product stored on a non-transitory computer-readable storage medium and to be executed by a computer to perform a process, the process comprising:
obtaining an identifier of a target first program selected as an install target, and device information of a device selected as an install destination of the target first program;
determining whether at least one existing first program is already installed in the device based on whether the device information includes an identifier and a version of the existing first program, the target first program and the existing first program being different types of programs;
when no existing first program is already installed in the device, determining that the target first program is installable in the device;
when the existing first program is already installed in the device, referring to a storage memory unit, which stores combination information for each combination of first programs of different types that can coexist in the device in association with versions of the first programs in the combination, to determine whether the storage memory unit stores corresponding combination information for a combination of the target first program and the existing first program whose identifier is included in the device information;
when the corresponding combination information is stored in the storage memory unit, determining whether the version of the existing first program in the device information matches the version of the existing first program stored in the storage memory unit in association with the corresponding combination information; and
when the version of the existing first program in the device information does not match the version of the existing first program stored in the storage memory unit, determining that the target first program cannot coexist with the existing first program in the device and generating update report information for reporting that the existing first program needs to be updated to install the target first program in the device,
wherein one or more sets of the combination information are stored in the storage memory unit for each of the first programs.

8. The computer program product as claimed in claim 7, wherein the storage memory unit also stores, in association with the combination information, a list of second programs that are used by the combination of the first programs, and the device information also includes a list of existing second programs that are already installed in the device; and
wherein the process further comprises:
determining, by referring to the storage memory unit, a target second program that is to be used by the target first program and the existing first program in the corresponding combination information, and
when the target second program is not included in the list of existing second programs in the device information, generating install report information for reporting that the target second program needs to be installed in the device.

9. The computer program product as claimed in claim 7, wherein the storage memory unit also stores, in association with the combination information, a list of second programs that are used by the combination of the first programs and versions of the second programs, and the device information also includes a list of existing second programs that are already installed in the device and versions of the existing second programs; and
wherein the process further comprises:
determining, by referring to the storage memory unit, a target second program that is to be used by the target first program and the existing first program in the corresponding combination information and a version of the target second program, and
when the target second program and the determined version of the target second program are not included in the device information, generating install report information for reporting that the target second program with the determined version needs to be installed in the device.

* * * * *